(12) United States Patent
Horng et al.

(10) Patent No.: US 7,428,087 B1
(45) Date of Patent: Sep. 23, 2008

(54) MIRROR STRUCTURE FOR LASER PRINTER

(75) Inventors: Alex Horng, Kaohsiung (TW); Tsung-Lin Yang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 12/003,529

(22) Filed: Dec. 28, 2007

(30) Foreign Application Priority Data

Dec. 4, 2007 (TW) .............................. 96146194 A

(51) Int. Cl.
 *G02B 26/08* (2006.01)
 *H02K 7/09* (2006.01)
(52) U.S. Cl. ..................... 359/200; 359/216; 310/90.5
(58) Field of Classification Search ................ None
 See application file for complete search history.

(56) References Cited

U.S. PATENT DOCUMENTS 5,831,363 A * 11/1998 Fukita et al. .................. 310/91

2005/0018326 A1* 1/2005 Yoon ........................... 359/877
2006/0039058 A1* 2/2006 Mori ........................... 359/216

* cited by examiner

*Primary Examiner*—James Phan
(74) *Attorney, Agent, or Firm*—Bacon & Thomas, PLLC.

(57) ABSTRACT

The present invention relates to a weight-balancing structure for rotary polygon mirror of color laser printer, 1 which includes a stator set, a rotor set having a loading disc fixed on a spindle, a motor housing disposed underneath the loading disc, and a rotary polygon mirror is fixedly integrated with the loading disc with a spring member. The spring member has a plurality of spring paws disposed around the circumference thereof and obliquely extended in a downward direction. At least two spring paws are further integrally formed with a ring portion, and the ring portion is located around the outer circumference of each spring member and formed to curl in an upward direction. The weight block could be stuck on the inner periphery of the ring portion by an adhesive-applying means so that it won't come off while positioned in an environment of high rotation speed.

6 Claims, 5 Drawing Sheets

US 7,428,087 B1

MIRROR STRUCTURE FOR LASER PRINTER

FIELD OF THE INVENTION

The present invention relates to a weight-balancing structure for rotary polygon mirror of color laser printer, and more particularly to one that won't fall off in an environment of high rotation speed so as to secure the stable and balancing effect while the color laser printer is spinning at high speed.

BACKGROUND OF THE INVENTION

A color laser printer employs one set or multiple sets of laser scanning unit (LSU) to irradiate a single beam or multiple beams and has a rotary polygon mirror disposed on a path irradiated by light beams. The rotation angle of the rotary polygon mirror can be driven and controlled by a motor and a corresponding reflection angle configured in accordance with the alignment position of a photosensitive drum, so as to make the photosensitive drum exposed and developed by irradiating the light beams reflected by the rotary polygon mirror thereto while the motor and the LSU receive signal and operate.

The motor structure of the rotary polygon mirror, as shown in FIG. 1 and FIG. 2, includes a metal tube 10, a stator set 20 and a rotor set 30, in which the metal tube 10 is fixedly disposed on a bottom plate 13 and has a bottom lid 11 over the bottom portion of the metal tube 10, and an abrasion-resistant pad is placed inside the bottom lid 11;

the stator set 20 is disposed around the outer periphery of the metal tube 10 (only a silicon steel sheet of the stator set is drawn in FIG. 1); a bearing 14 is disposed inside the metal tube 10, a spindle 34 is enveloped centrally in the shaft hole of the bearing 14 and the bottom end of the spindle 34 is contacted with the abrasion-resistant pad 12 and is held in the shaft hole to rotate;

the rotor set 30 contains a loading disc 31 and a motor housing 32, the top end of the spindle 34 penetrates through the loading disc 31 centrally and is fixed therewith, the motor housing 32 is fixed underneath the loading disc 31 to enclose the stator set 20, and a permanent magnet 33 corresponding to the silicon steel sheet of the stator set 20 is disposed on the inner periphery of the motor housing 32.

The rotary polygon mirror 35 is disposed on top of the loading disc 31 and is fixed by a spring member 40 and a snap ring 36 so as to synchronously rotate with the loading disc 31. The spring member 40 has a center hole 41, and a plurality of spring paws 42 are disposed around the edge of the spring member 40 and obliquely extended in a downward direction, so that the surface of the rotary polygon mirror 35 is urged against by the plural spring paws 42 after the spindle is inserted in the center hole 41. Then, the end of the spindle 34 is clipped and fixed by the snap ring 36 to fix the rotary polygon mirror 35.

When the rotary polygon mirror 35 is assembled with a motor, a weight for securing the stable and balancing effect during high-speed rotation shall be further added and adjusted. As the rotary polygon mirror 35 is every costly, instead of employing a destructive weight-balancing means, regular vendors stick the weight block 351 to the surface of the rotary polygon mirror 35 with adhesive. Whereas, while the motor rotates at a speed of 27000 rpm, the weight block 351 fixed by an adhesive-applying means easily falls off or flings off as a result of gigantic centrifugal force arising from high-speed rotation, thus resulting in the loss of the stable and balancing effect and noise in the operation of color laser printer.

SUMMARY OF THE INVENTION

In view of the foregoing concern, the present invention thus provides a weight-balancing structure for rotary polygon mirror of color laser printer. By virtue of the bolstering effect of the ring portion of the spring member formed in an upwardly curling manner, the weight block won't come off in an environment of high rotation speed, and thus the stable and balancing effect of a color laser printer operated at high speed is secured.

The weight-balancing structure for rotary polygon mirror of color laser printer includes a metal tube, a stator set and a rotor set, wherein the stator set is disposed around the outer periphery of the metal tube, a bearing is disposed inside the metal tube, a spindle is inserted in the shaft hole of the bearing, the rotor set contains a loading disc and a motor housing fixed underneath the loading disc to enclose the stator set, a rotary polygon mirror is disposed on top of the loading disc and is fixed to the loading disc to make it synchronously rotate therewith.

As a plurality of spring paws are disposed around the circumference of the spring member 40 and are obliquely extended in a downward direction, and at least two spring paws are integrally formed with a ring portion, so that the ring portion is located around the outer circumference of the spring paws and is curled in an upward direction. Hence, the weight block can be stuck on the inner periphery of the ring portion by an adhesive-applying means. Besides, by the bolstering effect of the upwardly curling form of the ring portion, even though the weight block is positioned in an environment of high rotation speed, it will not come off, thereby securing a stable and balancing effect while a color laser printer is operating at high speed.

DETAILED DESCRIPTION OF THE PREFERRED EMBODIMENT

To stand out and comprehend the aforementioned objective, features and advantages of the present invention more, preferred embodiments of the present invention are specifically presented as follows in conjunction with detailed illustrative description.

Figure 1:
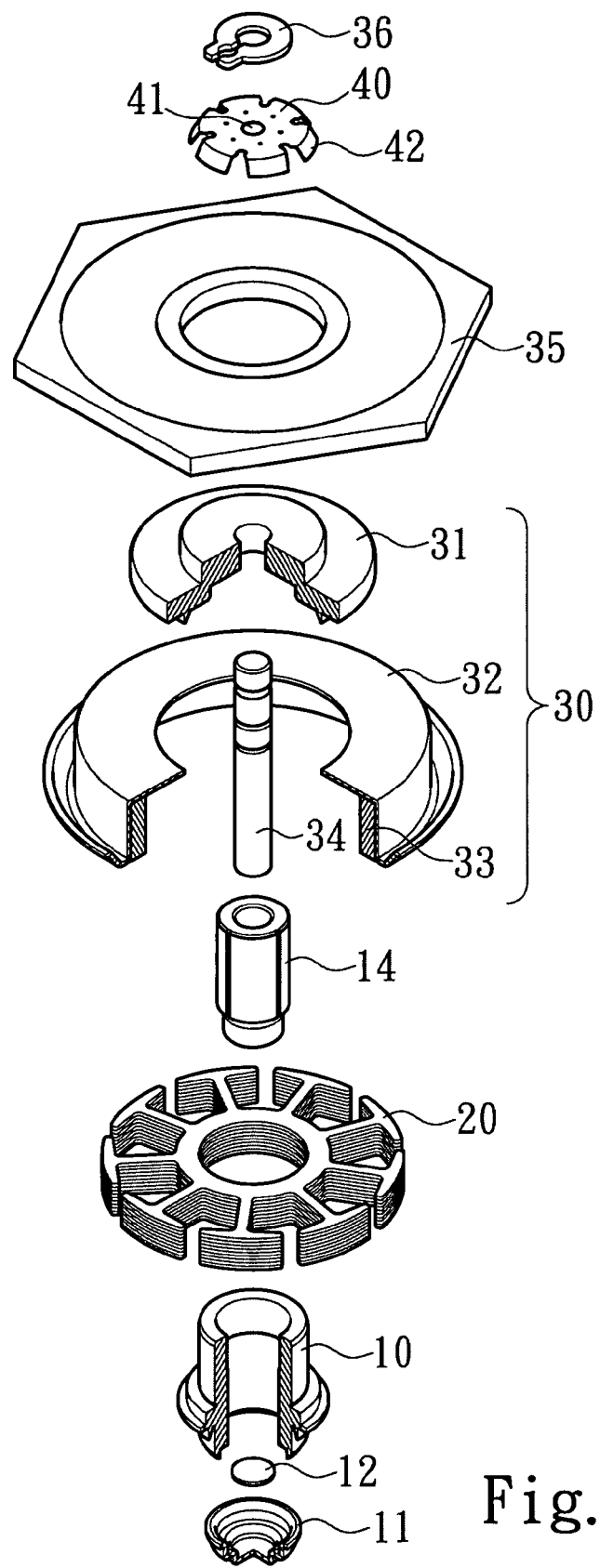
FIG. 1 is a three-dimensional exploded schematic view of a conventional structure.
Figure 2:
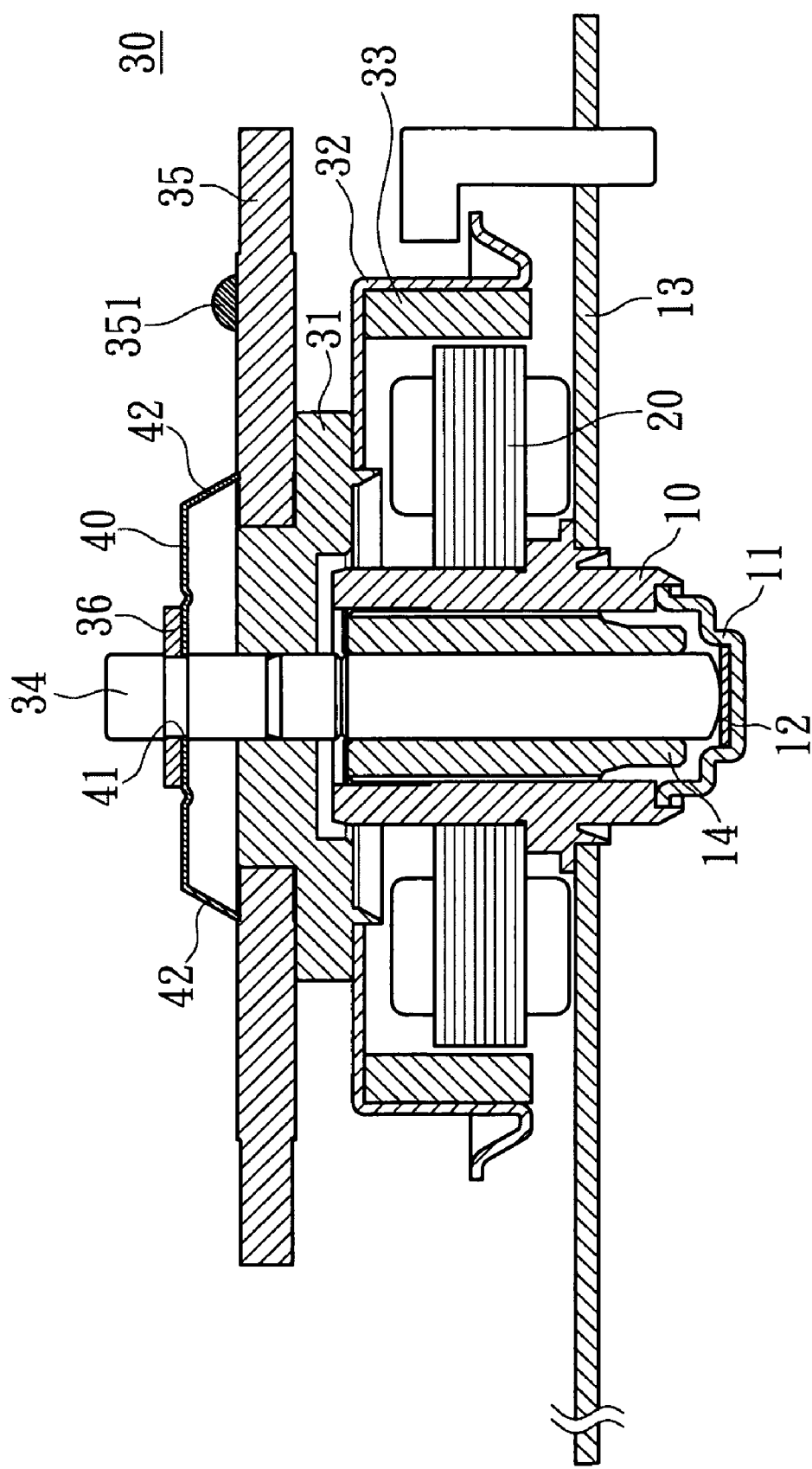
FIG. 2 is a cross-sectional view showing the assembly of the conventional structure.
Figure 3:
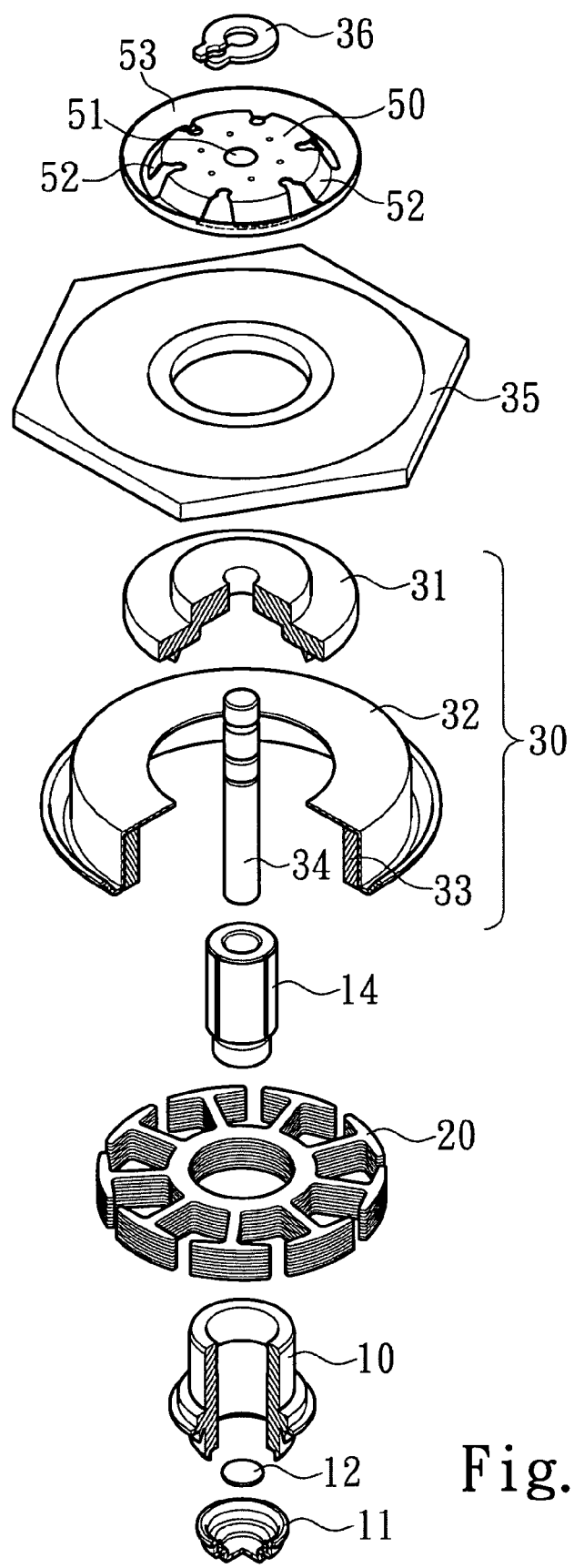
FIG. 3 is a three-dimensional exploded schematic view of the present invention.
Figure 4:
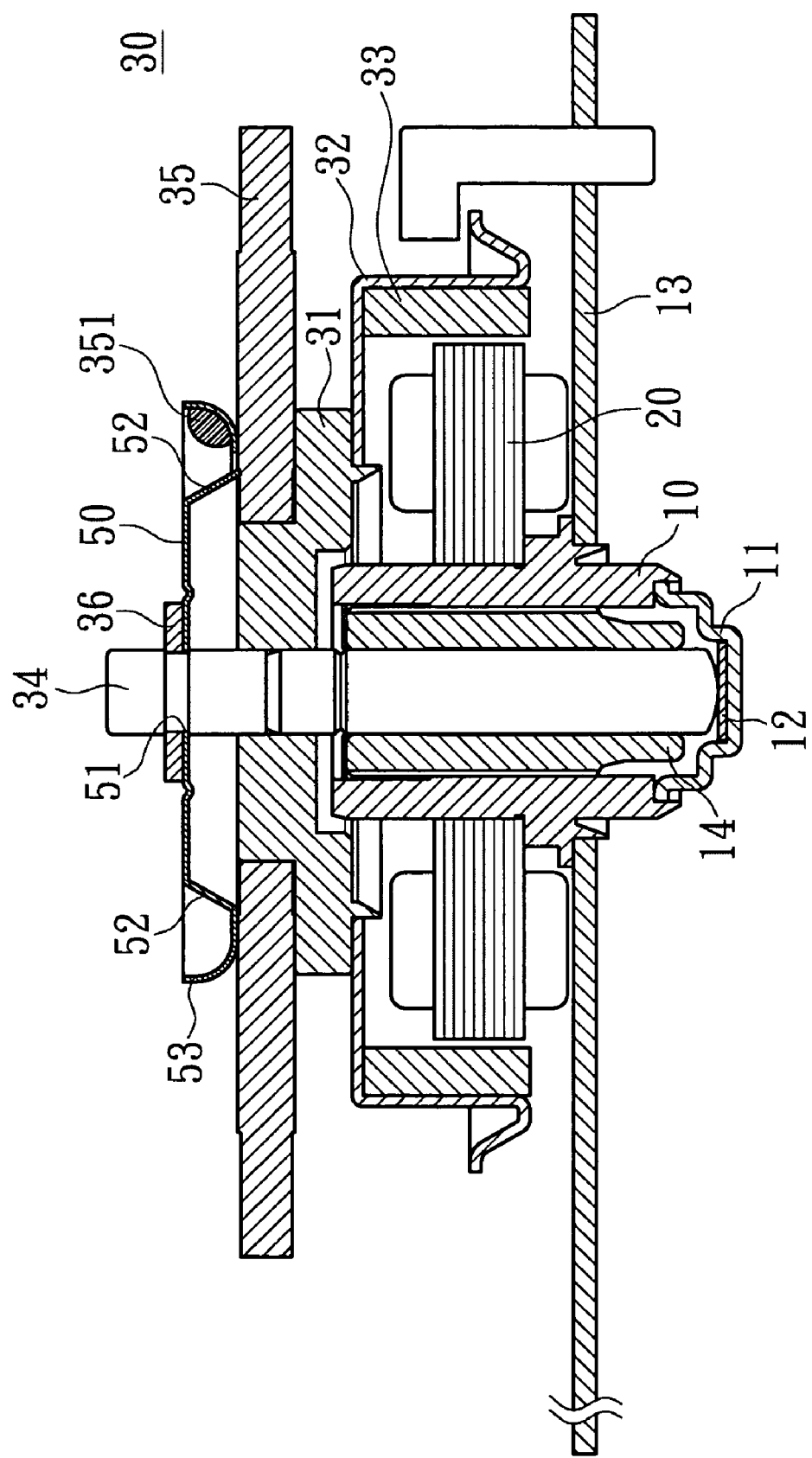
FIG. 4 is a cross-sectional view showing the assembly of the present invention.

As shown in FIG. 3 and FIG. 4, the weight-balancing structure for rotary polygon mirror in color laser printer includes a metal tube 10, a stator set 20 and a rotor set 30, in which the metal tube 10 is fixedly disposed on a bottom plate 13 (as shown in FIG. 4), a bottom lid 11 is disposed at the bottom portion of the metal tube 10, an abrasion-resistant pad 12 is placed inside the bottom lid 11;

the stator set 20 is disposed around the outer periphery of the metal tube 10 (only silicon steel sheet of the stator set in FIG. 1 is drawn), a bearing 14 is disposed inside the metal tube 10, a spindle 34 is centrally enveloped in the shaft hole of the bearing 14, the bottom end of the spindle 34 is contacted with the abrasion-resistant pad 12 and held in the shaft hole to rotate therewith;

the rotor set 30 contains a loading disc 31 and a motor housing 32, the top end of the spindle 34 penetrates through the loading disc 31 centrally and is fixedly integrated therewith, the motor housing 32 is fixed underneath the loading disc 31 so as to enclose the stator set 20, a permanent magnet 33 is disposed on the inner periphery of the motor housing 32 to correspond to the silicon steel sheet of the stator set 20;

a rotary polygon mirror 35 is disposed on top of the loading disc 31 and is fixed by a spring member 50 and a snap ring 36 so that the rotary polygon mirror 35 could synchronously rotate with the loading disc 31;

the spring member 50 has a center hole 51 and a plurality of spring paws 52 obliquely disposed on the circumference of the spring member 50 and extended in a downward direction, at least two spring paws 52 are further integrally formed with a ring portion 53, the ring portion 53 is located around the outer rim of each plural spring paw 52 and formed in an upwardly curled fashion; therefore, after the spindle 34 is inserted in the center hole 51 of the spring member 50, the plural spring paws 52 are urged against the bottom edge of the ring portion 53 to compress the surface of the rotary polygon mirror 35, and a snap ring 36 is clipped and fixed on an end portion of the spindle 34 to fasten the rotary polygon mirror 35.

Figure 5:
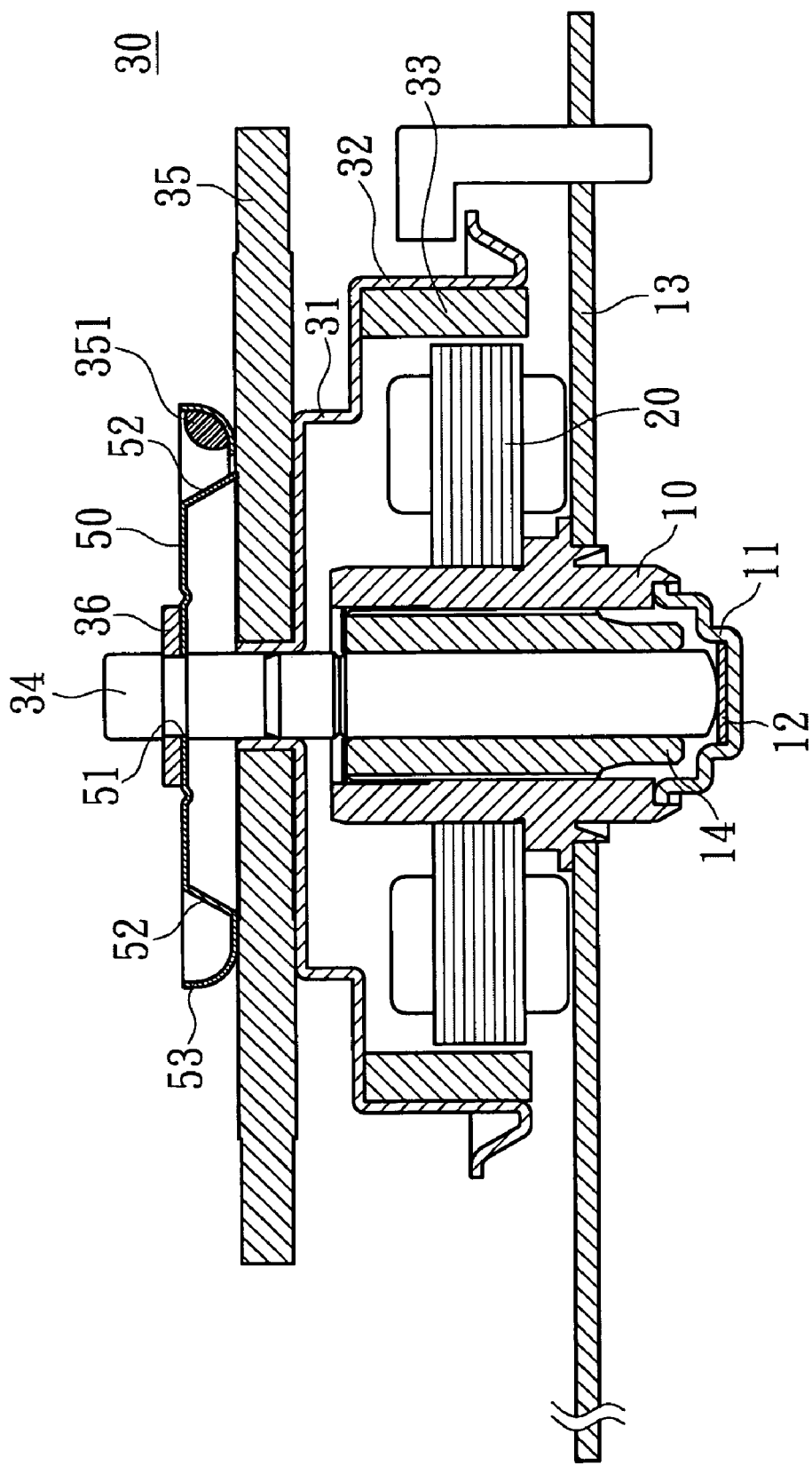
FIG. 5 is a cross-sectional view showing the assembly of another embodiment in the present invention.

Besides, another embodiment for the rotary set 30 of the present invention is shown in FIG. 5. Its loading disc 31 and motor housing 32 could be also integrally formed. The top end of the spindle 34 penetrates through the loading disc 31 centrally and is fixedly integrated therewith so that the motor housing 32 enclose the stator set 20 in a corresponding manner.

In sum, when the present invention performs a weight-balancing adjustment, the weight block can be stuck to the inner periphery of the ring portion of the spring member 50 by an adhesive-applying means. Because the ring portion 53 is formed in an upwardly curled fashion to provide a bolstering function, the weight block 351 won't come off even if the weight block is positioned in an environment where the motor rotates at 27000 rpm, thereby securing a stable and balancing effect for the high-speed rotation of a color laser printer. From the above-mentioned characteristics those features not only have a novelty among similar products and a progressiveness but also have an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A weight-balancing structure for rotary polygon mirror in color laser printer, comprising:

a stator set;

a rotary set having a loading disc, a motor housing located underneath said loading disc and disposed to enclose said stator set, and a permanent magnet disposed on an inner periphery of said motor housing to correspond to said stator set; and a rotary polygon mirror disposed on top of said loading disc and fixed to said loading disc with a spring member to synchronously rotate therewith;

wherein a plurality of spring paws are disposed around a circumference of said spring member and extended obliquely in a downward direction, at least two spring paws are integrally formed with a ring portion, said ring portion is located around an outer circumference of said plural spring paws and formed in an upwardly curled manner, so that a weight block is stuck on an inner periphery of said ring portion by an adhesive-applying means.

2. The weight-balancing structure as set forth in claim 1, wherein said stator set is disposed around an outer periphery of said metal tube, a bearing is disposed inside said metal tube, a spindle is enveloped centrally in a shaft hole, and a top end of said spindle penetrates through said loading disc centrally to be fixedly integrated therewith.

3. The weight-balancing structure as set forth in claim 1, wherein said spring member has a center hole for said spindle to be inserted therein so that said plural spring paws are urged against a bottom edge of said ring portion to compress said rotary polygon mirror, and a snap ring is clipped and fixed on an end portion of said spindle.

4. The weight-balancing structure as set forth in claim 2, wherein said metal tube is fixedly disposed on a bottom plate having a bottom lid disposed thereon, and an abrasion-resistant pad is placed inside the bottom lid to make an bottom end of said spindle be in contact with said abrasion-resistant pad.

5. The weight-balancing structure as set forth in claim 1, wherein said loading disc and said motor housing are integrally formed.

6. The weight-balancing structure as set forth in claim 1, wherein said loading disc and said motor housing are detached and is assembled by a fixing means.

* * * * *